US006910984B1

(12) United States Patent
Fragnito

(10) Patent No.: US 6,910,984 B1
(45) Date of Patent: Jun. 28, 2005

(54) POSITIVE ENGAGEMENT CONTINUOUSLY VARIABLE TRANSMISSION

(76) Inventor: Frank A. Fragnito, 4204 Boone La., Sacramento, CA (US) 95821-4206

( * ) Notice: Subject to any disclaimer, the term of this patent is extended or adjusted under 35 U.S.C. 154(b) by 0 days.

(21) Appl. No.: 10/776,132

(22) Filed: Feb. 11, 2004

(51) Int. Cl.[7] .............................................. F16H 37/02
(52) U.S. Cl. ....................... 475/207; 475/333; 475/336
(58) Field of Search ............................... 475/207, 208, 475/209, 331, 333, 334, 336, 346

(56) References Cited

U.S. PATENT DOCUMENTS

| | | | | |
|---|---|---|---|---|
| 1,704,896 A | * | 3/1929 | Kizziar | 475/207 X |
| 2,458,706 A | * | 1/1949 | Howe | 475/333 X |
| 4,680,985 A | * | 7/1987 | Troester | 475/336 X |
| 5,390,558 A | * | 2/1995 | Weinberg | 74/124 |

FOREIGN PATENT DOCUMENTS

EP 408243 * 1/1991

* cited by examiner

Primary Examiner—Ha Ho
(74) Attorney, Agent, or Firm—Alfred M Walker

(57) ABSTRACT

A continuously variable transmission comprises a cone shaped member having a shaft centrally positioned therethrough and having a plurality of radially extending wings. The cone shaped member may be slidably moveable axially with respect to said drive shaft. A ring gear encircles the cone shaped member in interlocking communication. The ring gear may be enclosed by a housing and pivotable about a fixed point. A plurality of linkage arms may be pivotally connected to the radially extending wings and each said linkage arm is pivotally connected to a joining member. Each radially extending wing comprises a ledge portion for receiving a linkage arm, wherein each linkage arm comprises a slider member for slidably engaging the ledge. The transmission controls the sliding of the cone shaped member horizontally along the axis of the drive shaft, which results in a proportional angular displacement of the ring gear about the point of pivot.

14 Claims, 5 Drawing Sheets

POSITIVE ENGAGEMENT CONTINUOUSLY VARIABLE TRANSMISSION

FIELD OF THE INVENTION

The present invention relates to continuously variable transmissions.

BACKGROUND OF THE INVENTION

A transmission is used to match the speed and torque of a rotating load with that of the motor or engine driving it. The driven end is designated as the input while the shaft or member attached to the load is designated as the output.

In vehicular applications, the input speed is always higher than the output speed of a transmission, while in some industrial applications where high speed is required for an operation, the opposite is sometimes true. In any case, a transmission has an input and an output and has control over the ratio of rotational speed between them.

Gears have traditionally been used to achieve these speed ratios. Multiple gear sets are used within a transmission if a variety of fixed ratios is required. A more desirable device would offer the user the ability to continuously vary the speed ratio between input and output over a wide range. Continuously variable transmissions (CVT's) have been designed to achieve this result.

A wide variety of geometric alternatives and driving members have been tried over the years. Disk/disk, ball drives and belt drives have been used in CVT's. Some designs used sliding friction while others used rolling friction between members to transmit torque from input to output. While gears use mechanical interlocking to prevent slippage, friction drive elements are subject to slippage and may have a limiting capability to transfer torque. Therefore, the size of the elements themselves must be increased or the contact forces between them must be increased (or both) to provide adequate torque capability. The measures to prevent slippage work against the dual goals of achieving compactness and low component wear. This has been the principle impediment to the broad application of CVT's in heavy-duty applications.

Further, in the employment of gear systems for CVT applications, there exists a problem of continuously phasing the gear teeth of the gear in communication with the input shaft and the gear teeth in communication with the output shaft. The current invention provides a means for compensating for a continuously varying phase difference in a manner which is smooth and minimizes wear.

OBJECTS OF THE INVENTION

It is therefore an object of the present invention to provide a reliable, positive, infinitely variable speed transmission, which controls ratio control, while minimizing slippage and preventing component wear and tear.

SUMMARY OF THE INVENTION

A continuously variable transmission comprises a cone shaped member having a shaft centrally positioned therethrough and having a plurality of radially extending wings. The cone shaped member may be slidably moveable axially with respect to said drive shaft. A ring gear encircles the cone shaped member in interlocking communication. The ring gear may be enclosed by a housing and pivotable about a fixed point. A plurality of linkage arms may be pivotally connected to the radially extending wings and each said linkage arm is pivotally connected to a joining member. Each radially extending wing comprises a ledge portion for receiving a linkage arm, wherein each linkage arm comprises a slider member for slidably engaging the ledge. Each linkage arm may comprise a first strut and a second strut parallel to the first strut. The slider member may comprise a first clamp and opposing second clamp for slidably contacting said ledge of said radially extending wing and a worm gear for engaging the cone member with the ring gear. An axle extends from the first clamp to the second clamp and may support the worm gear and allow for rotation of the worm gear. The cone member may comprise a central bore for receiving a drive shaft, a plurality of extension arms having at least one receptacle for pivotally receiving at least one linkage arms.

Preferably, the joining member is separated from the cone member by a length generally equal to the length of the ledge member and the diameter of the joining member may equal at least the minimum obtainable diameter of the cone shaped member. The CVT may further comprising a means for controllably sliding the cone shaped member horizontally along the axis of the drive shaft, wherein the sliding of the cone shaped member results in a proportional angular displacement of the ring gear about the point of pivot. The means of controllably sliding may comprises a DC motor, servomotor, a serpentine belt system or other linear actuator known within the art.

The present invention combines the desirable feature of the continuously variable transmission with the non-slip characteristics of a gear drive. It achieves this combination with a cone drive geometry using a pivoting linkage system for communicating with an outer gear in communication with an output shaft. Variable ratios are adjusted.

While it is understood that either the cone shaft or the other shaft can be designated as input or output depending on the desired step-up or step-down ratio of an application. Elements such as transmission housings and lateral or vertical adjustment mechanisms are not detailed in this invention as they are well known in the art. Adjustment mechanisms for altering the gear ratio can take several forms such as a hand or motor-driven lead screw and nut or a hydraulic cylinder. A recently introduced device for position control is a servo controlled pneumatic cylinder with an auxiliary element using magneto-rheological fluid for added precision; this device may be used as well.

A secondary but equally important function of these lateral and vertical adjustment mechanisms is to resist forces arising out of normal operation that would tend to disturb the selected positions which correspond directly to the desired ratio.

DETAILED DESCRIPTION OF THE INVENTION

In the description which follows, in connection with the foregoing drawing Figures, an apparatus for continually varying the great ratio for a transmission system is described.

Figure 1:
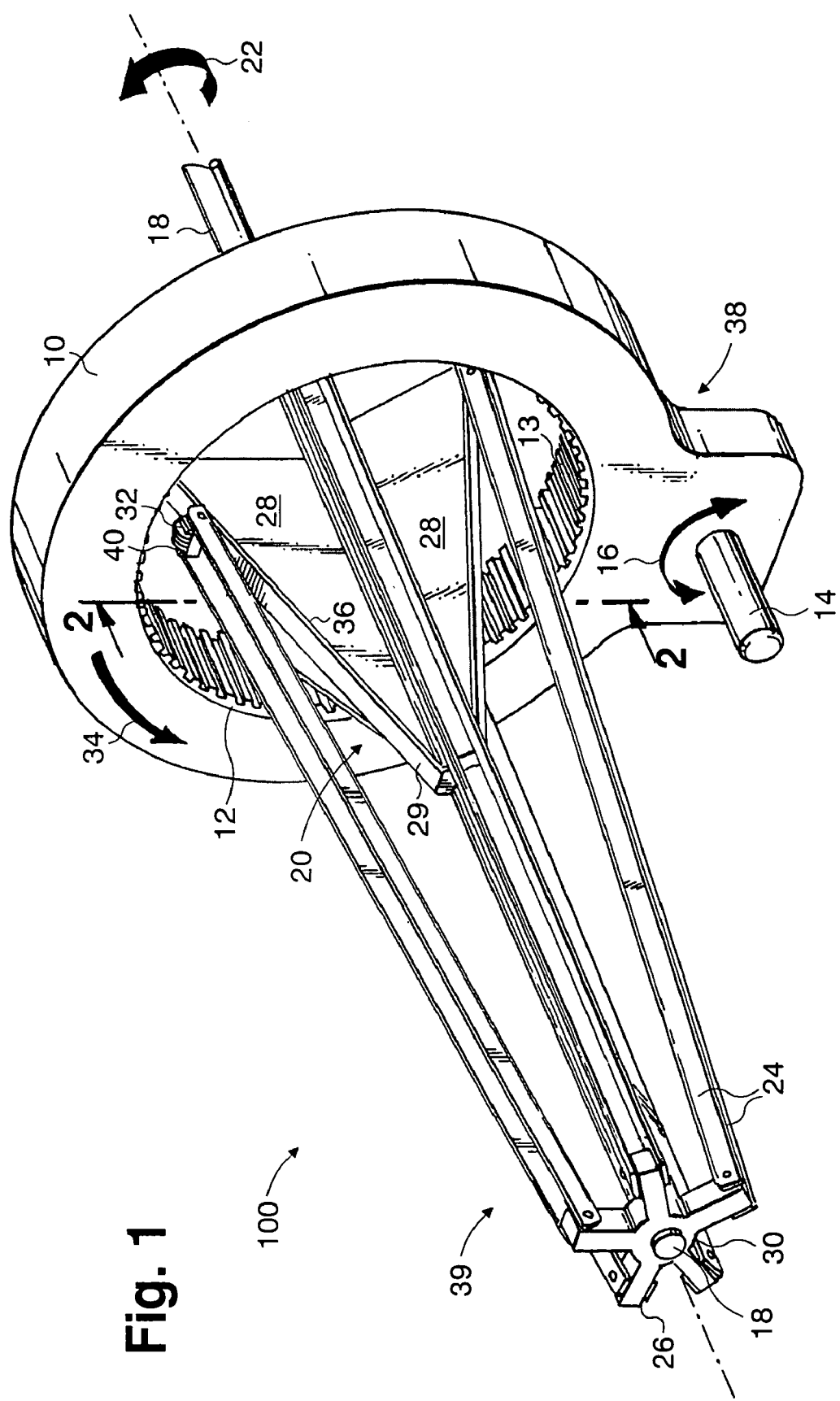
FIG. 1 is a perspective view of the current invention.

FIG. 1 illustrates a first embodiment of the current invention, a continuous variable transmission system 100. A drive shaft 18 forms the axis for a cone member 20 which is slidably moveable axially with respect to the drive shaft 18. The drive shah 18 rotates 22 as a function of engine output and turns the cone member 20 respectively. The cone member 20 serves as a radially adjustable sun gear within a ring gear 12 of a fixed radius. The ring gear 12 thus communicates with an output shaft (not shown).

Specifically, the cone member 20 comprises a plurality of wing members 28. For reducing wear to the cone member and the ring gear as well as reducing the shear contact force between each member, it is preferred for the cone member 20 to comprise at least five wing members 28.

Each wing member 28 extends from one lateral end of the cone member 20 to the opposing lateral end. One end of the wing member 28 is shorter than the second end creating a trapezoidal shape. Each of the wing members 28 extends radially from the drive shaft 18. Each wing member 28 also comprises a ledge portion 36 perpendicular to the plane of the wing member. A slider 32 is slidably connected to the ledge portion 36 of the wing member 28. Each slider 32 comprises a freely rotatable worm gear 40 and is rotatably connected to a pair of linkage arms 24.

The linkage arms 24 serve to connect each slider 32 to a fixed joining member 30 such that lateral movement of the cone member 20 results in radial movement of the sliders 32 extending from the axis of the drive shaft 18. The joining member 30 is rigidly connected to the drive shaft 18, rotating with the drive shaft 18 and comprises a plurality of joining arms 26 extending radially outward and aligning with each wing member 28 of the cone member 20. Each joining arm 26 receives a pair of linkage arms 24 in communication with the respective slider 32.

An output system 38 communicates with the input system 40. The output system comprises a ring gear 12 supported by and located within a housing 10. The output system also comprises a pivot bore 14. The ring gear 12 is free to rotate within the housing 10. The ring gear 12 is laterally fixed and encircles the cone member 20. The width of the ring gear 12 is at least equal to the relative lateral change in position of the sliders 32 resulting from the change in arc of the linkage arms 24. The pivot bore 14 receives a pivoting pin and thus allows for rotation 16 of the output system 38. This rotation 16 is controlled and the relative angular position of the output system is proportional to the lateral position of the cone member.

Figure 2:
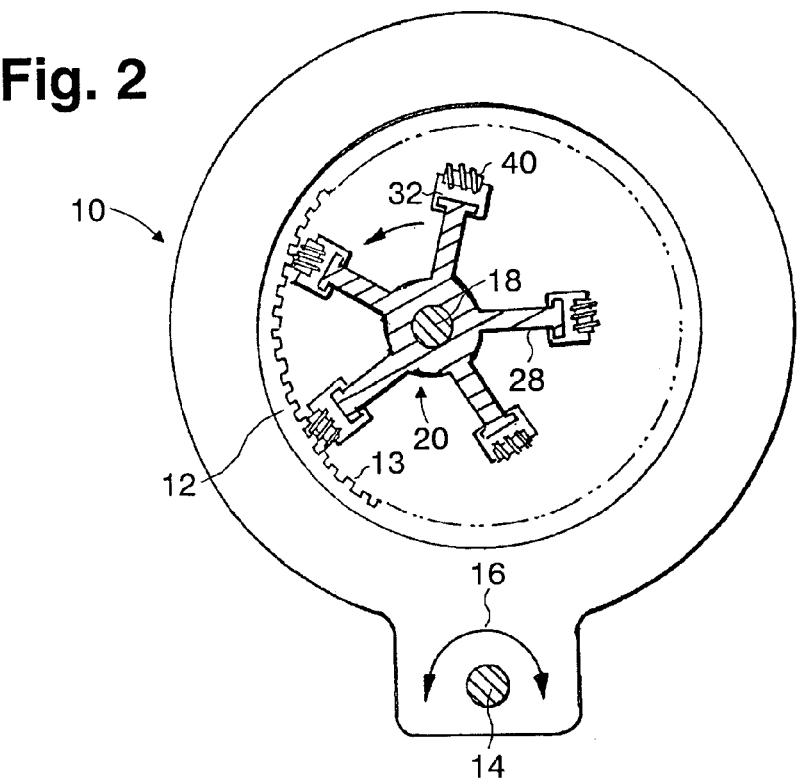
FIG. 2 is a cutaway cross-sectional view of the invention in FIG. 1, the plane of cross-section being formed of the points of intersection between the ring gear and the sliders.

FIG. 2 is a cross-sectional view illustrating the meshing between the cone member 18 and the ring gear 12. As the wing members 28 rotate, controlled by the drive shaft 18, each slider 32 is laterally aligned with the ring gear 12.

The worm gear 40 may have at least two degrees of freedom. The first degree of freedom is rotation 22 along with the cone member 20 about the axis of the drive shaft 18. In this way, as an individual slider 32 approaches the teeth of the ring gear 12, the worm gear 40 engages the teeth of the ring gear 12, i.e. the worm gear 40 functions as a portion of gear teeth. Thus, the worm gears 40, in practicality, form a sun gear within a ring gear, well known in the art as a planetary gear system.

The second degree of freedom of the worm gear 40 is to rotate about a supporting axle within the slider. This degree of freedom allows for phase correction of potential misalignment of the worm gear 40 with the teeth of the ring gear 12.

The drive shaft 18 is in a fixed position and may not translate under varying transmission gear ratio. However, as the cone member 20 translates laterally (in and out of the viewed page, according to FIG. 2), the effective radius of the apparent sun gear increases proportionally. As the sun gear radius increases, the output system rotates relatively slightly about pivot point 14, proportional to and accommodating the repositioning of the sun gear. Preferably, in the position of minimal radius, the angle separating each wing member 28 is small enough such that at least two separate worm gears 40 contact the ring gear 12 at any given time.

Figure 2A:
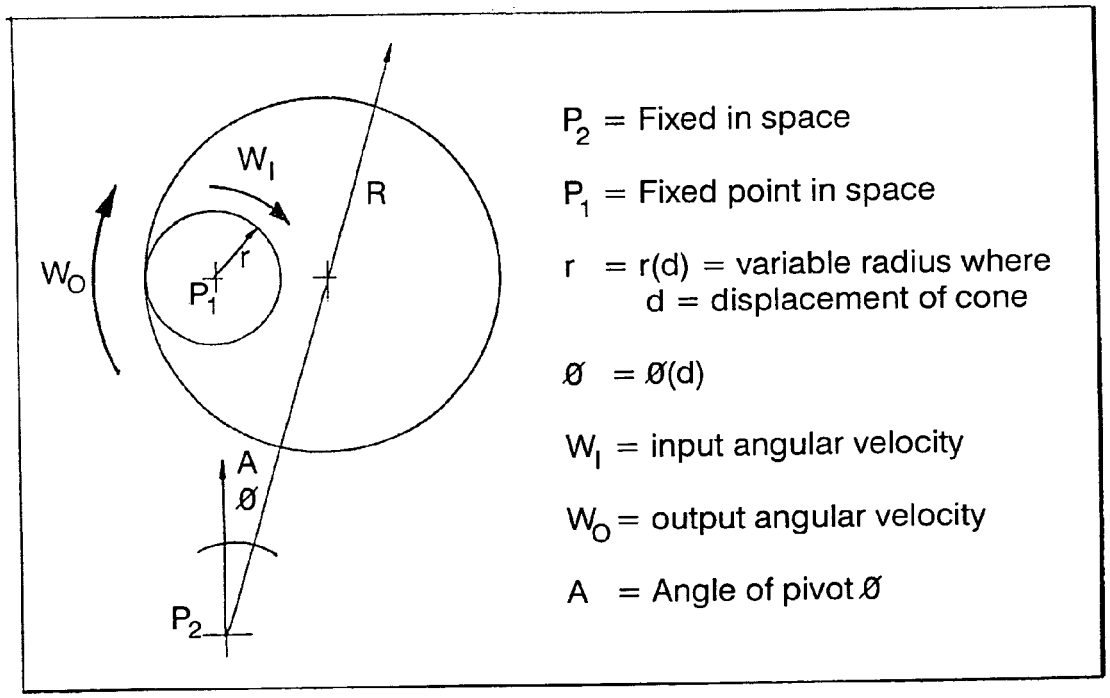
FIG. 2A is a geometric depiction of the gear assembly as in FIG. 2.

FIG. 2A illustrates a geometric representation of the gear system described in FIG. 2. The angle of pivot of the output system is label A. The input angular velocity is labeled $W_i$ and the output angular velocity is labeled W. The radius of the sun gear is marked r(d) demonstrating dependency on d, the lateral displacement of the cone member. The point of pivot of the output system is also fixed in space.

Figure 3:
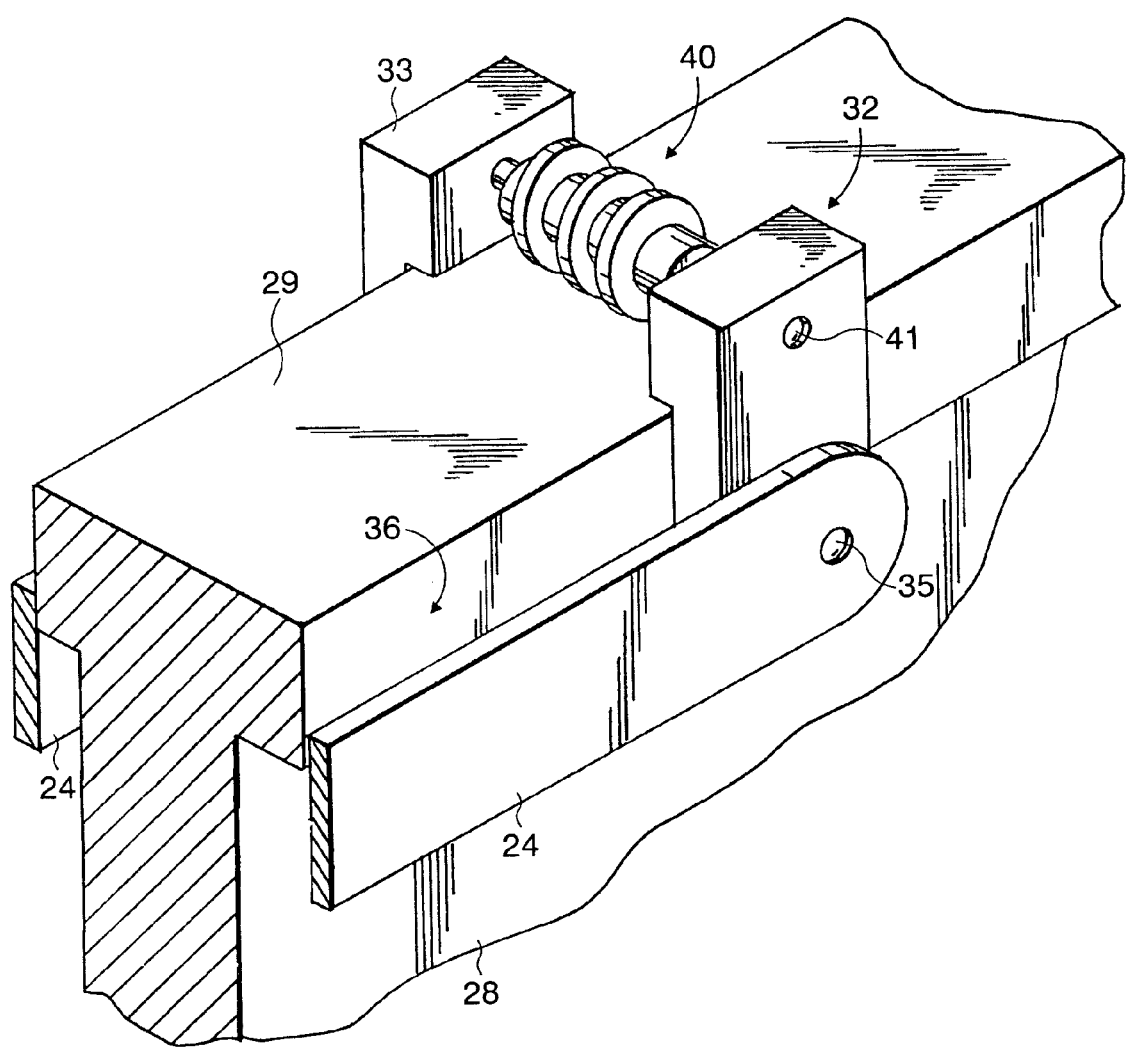
FIG. 3 is a perspective view of the slider portion of the embodiment of the current invention of FIG. 1.

FIG. 3 is a detailed view of the slider 32. Pin 35 rotatably connects the linkage arm 24 to a clamp 33. The clamp 33 straddles the ledge 29 of the wing member 28 in slidable communication. The worm gear 40 is supported by axle 41 in free rotation.

Figure 3A:
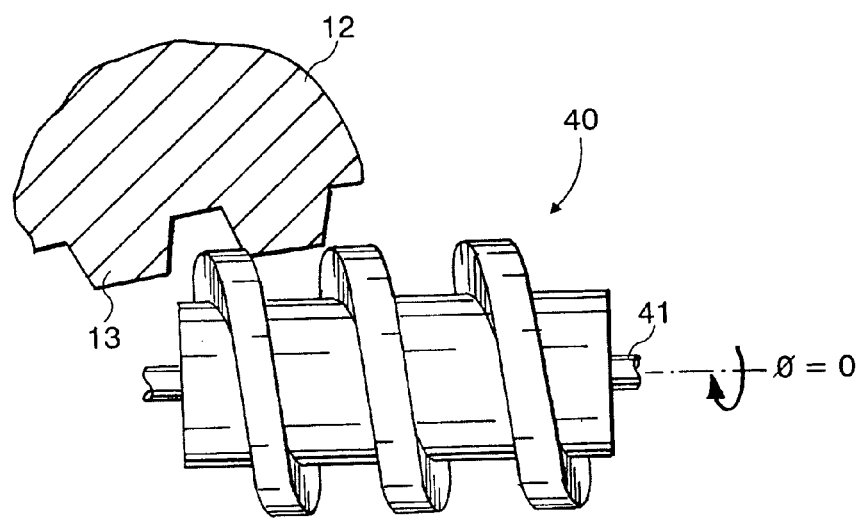
FIGS. 3A and 3B are cross-sectional partial views of the slider portion of the embodiment of the current invention of FIG. 1.
Figure 3B:
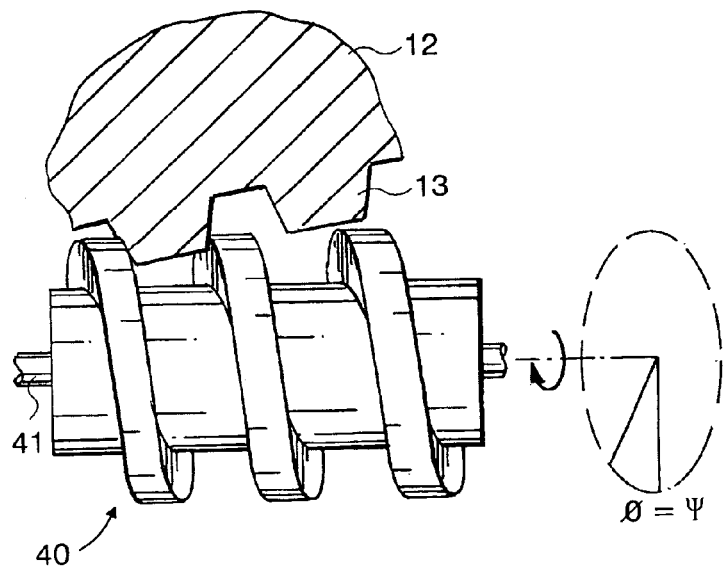

FIG. 3A and FIG. 3B demonstrate the second degree of freedom of the worm gear 40 as described herein. FIG. 3A represents a first encounter between the worm gear 40 and the ring gear 12. There may exist a misalignment between the teeth of the ring gear 12 and the crevasses of the worm gear 40. In such a case, the contacting tooth 13 of the ring gear 12 exerts a contact force component normal to the axis of the worm gear. The contact force acts to turn the worm gear 40 about the supporting axle 41, thus resulting in an apparent lateral shift when viewing cross-sectionally, until a point is reached where the tooth 13 "locks into" position and the phase difference is compensated for.

Figure 4:
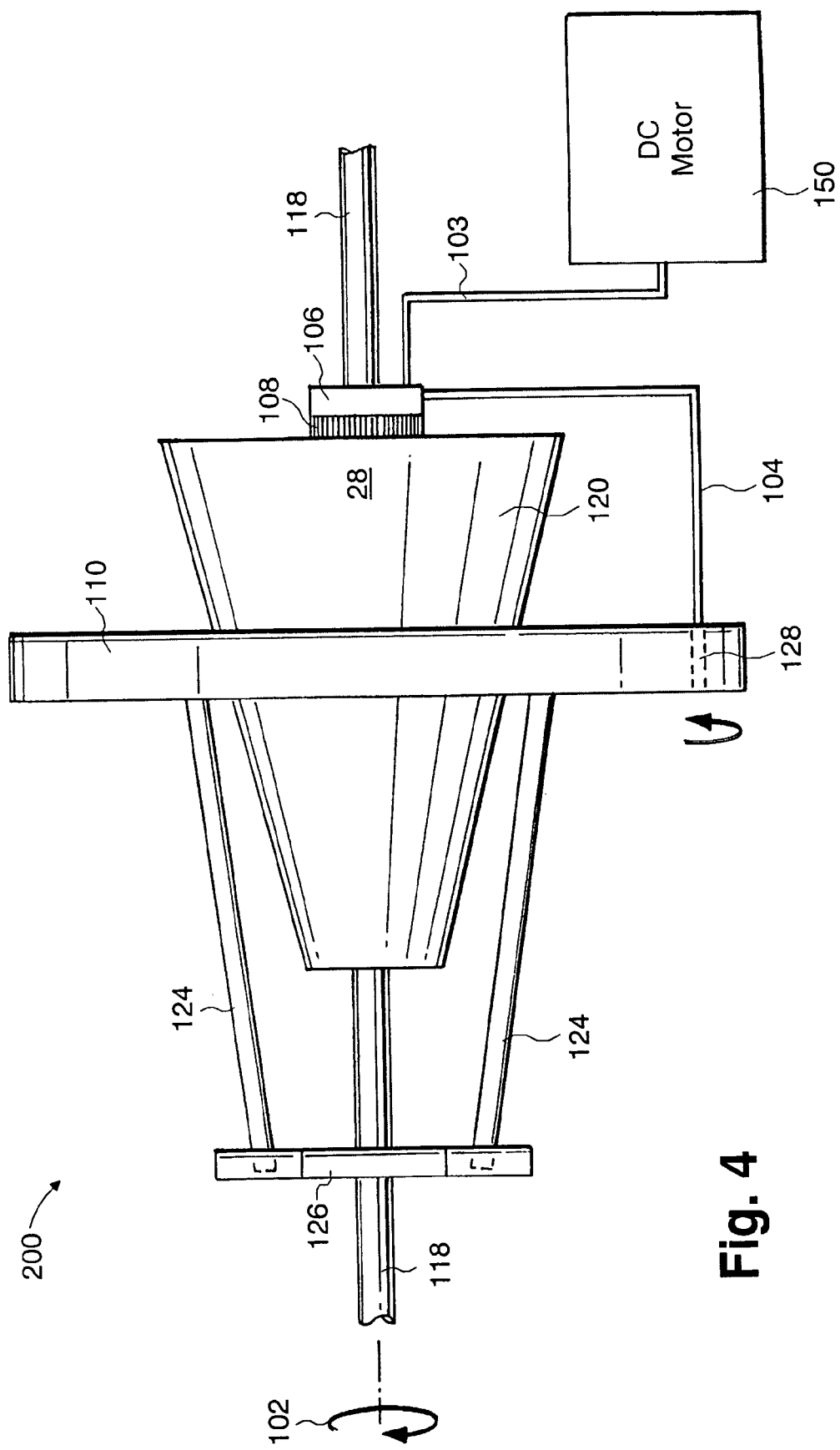
FIG. 4 is a side-view cross-section of a second embodiment of the current invention.

FIG. 4 depicts a second embodiment of the current invention. In this case, a DC motor 150 is employed as a means of controlling the lateral movement of the cone member 120, namely an automatic positioning device. The automatic positioning device may equivalently be a hydraulic system, servomotor, or other positioning system known within the art. The movement of the cone member correlates to a proportional pivotal angular movement of the ring gear housing. The pivot point 128 and the axis of the drive shaft remain constant.

It is further known that other modifications may be made to the present invention that departing from the scope of the present invention, as noted in the appended claims.

I claim:

1. A continuously variable transmission comprising:
   a cone shaped member having a shaft centrally positioned therethrough, said cone shaped member comprising a plurality of radially extending wings;
   said cone shaped member being slidably moveable axially with respect to said drive shaft;
   a ring gear encircling said cone shaped member, said ring gear in interlocking communication with said cone member;
   said ring gear enclosed by a housing and pivotable about a fixed point; and a plurality of linkage arms, each said linkage arm pivotally connected to said radially extending wing and each said linkage arm pivotally connected to a joining member.

2. A continuously variable transmission as in claim 1 wherein each said radially extending wing comprises a ledge portion for receiving said linkage arm, and each said linkage arm comprises a slider member for slidably engaging said ledge.

3. A continuously variable transmission as claimed in claim 1 wherein said plurality of radially extending wings comprises at least five radially extending wings.

4. A continuously variable transmission as claimed in claim 1 wherein said each said linkage arm comprises a first strut and a second strut parallel to said first strut.

5. A continuously variable transmission as in claim 2, wherein each said slider member comprises:
 a first clamp and opposing second clamp for slidably contacting said ledge of said radially extending wing;
 a worm gear for engaging said cone member with said ring gear; and
 an axle extending from said first clamp to said second clamp for supporting said worm gear and allowing for rotation of said worm gear.

6. A continuously variable transmission as claimed in claim 4 wherein said cone member comprises a central bore for receiving said drive shaft; and
 said joining member comprises a plurality of joining arms, each said joining arm having at least one receptacle for pivotally receiving at least one of said linkage arms.

7. A continuously variable transmission as claimed in claim 2 wherein said joining member is separated from said cone member by a length substantially equal to the length of said ledge member.

8. A continuously variable transmission as claimed in claim 1 wherein a diameter of said joining member equals at least a minimum obtainable diameter of said cone shaped member.

9. A continuously variable transmission as in claim 1 further comprising a means for controllably sliding said cone shaped member horizontally along the axis of said drive shaft.

10. A continuously variable transmission as in claim 9, wherein said sliding of said cone shaped member results in a proportional angular displacement of said ring gear about said point of pivot.

11. A continuously variable transmission as in claim 10, wherein said means of controllably sliding comprises a DC motor.

12. A continuously variable transmission as in claim 10, wherein said means of controllably sliding comprises a servomotor.

13. A continuously variable transmission as in claim 10, wherein said means of controllably sliding comprises a serpentine belt system.

14. A continuously variable transmission comprising:
 a cone shaped member having a drive shaft centrally positioned therethrough, wherein said cone member comprises a central bore for receiving said drive shaft, said cone shaped member comprising a plurality of radially extending wings;
 said cone shaped member being slidably moveable axially with respect to said drive shaft;
 a ring gear encircling said cone shaped member, said ring gear in interlocking communication with said cone member;
 said ring gear enclosed by a housing and pivotable about a fixed point;
 a plurality of linkage arms, each said linkage arm pivotally connected to said radially extending wing and each said linkage arm pivotally connected to a joining member comprises a plurality of joining arms, each said joining arm having at least one receptacle for pivotally receiving at least one of said linkage arm;
 wherein each said radially extending wing comprises a ledge portion for receiving said linkage arm, and said linkage arm comprises a slider member for slidably engaging said ledge;
 wherein said each said linkage arm comprises a first strut and a second strut parallel to said first strut;
 wherein said slider member comprises a first clamp and opposing second clamp for slidably contacting said ledge of said radially extending wing;
 a worm gear for engaging said cone member with said ring gear; and
 an axle extending from said first clamp to said second clamp for supporting said worm gear and allowing for rotation of said worm gear.

* * * * *